(12) United States Patent
Iwata

(10) Patent No.: US 6,719,272 B1
(45) Date of Patent: Apr. 13, 2004

(54) VALVE AND VACUUM PROCESSING DEVICE WITH THE VALVE

(75) Inventor: Teruo Iwata, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 221 days.

(21) Appl. No.: 09/926,682

(22) PCT Filed: Jun. 1, 2000

(86) PCT No.: PCT/JP00/03539
§ 371 (c)(1),
(2), (4) Date: Nov. 30, 2001

(87) PCT Pub. No.: WO00/75544
PCT Pub. Date: Dec. 14, 2000

(30) Foreign Application Priority Data

Jun. 2, 1999 (JP) ............................. 11-155540

(51) Int. Cl.⁷ ..................... F16K 41/10; F16K 3/02; F16K 51/02
(52) U.S. Cl. ........................ 251/330; 251/326
(58) Field of Search .................. 251/318–334

(56) References Cited

U.S. PATENT DOCUMENTS

| | | | |
|---|---|---|---|
| 4,468,000 A | * 8/1984 | Smith | 251/321 |
| 4,569,503 A | * 2/1986 | Karr, Jr. | 251/327 |
| 4,681,329 A | 7/1987 | Contin | |
| 4,721,282 A | 1/1988 | Shawver et al. | |
| 4,798,223 A | * 1/1989 | Mitchell et al. | 137/312 |
| 5,971,025 A | * 10/1999 | Backlund | 251/331 |
| 6,016,826 A | * 1/2000 | Bake et al. | 251/327 |

FOREIGN PATENT DOCUMENTS

| | | |
|---|---|---|
| JP | 57-107079 | 7/1982 |
| JP | 61-130686 | 6/1986 |
| JP | 2-76281 | 6/1990 |
| JP | 6-37674 | 5/1994 |
| JP | 7-335711 | 12/1995 |

* cited by examiner

*Primary Examiner*—Paul J. Hirsch
(74) *Attorney, Agent, or Firm*—Oblon, Spivak, McClelland, Maier & Neustadt, P.C.

(57) ABSTRACT

The valve 10 includes a valve main body 11 having an opening 11A and forming a space which creates a part of a gas flow path, a first valve member 12, provided in the valve main body, for opening/closing the opening 11A, and a drive mechanism 40 for moving the first valve member 12 between a close position where the opening 11A is closed and an open position where the opening 11A is opened, wherein the drive mechanism 40 has a rod 14 to be reciprocated, an end of the rod 14 extends into the valve main body 11 through a through hole 11B formed in the valve main body 11 to be connected to the first valve member 12, the first valve member 12 is moved between the close position and the open position as the rod 14 is driven reciprocated, and the valve further comprising a sealing mechanism 15, which communicates into the valve main body 11 via the through hole 11B, for isolating the drive mechanism 40 side air-tightly from the valve main body, and a second valve member 17, provided on the rod 14 to move together with the rod 14 as it is reciprocated, which closes the through hole 11B when the first valve member 12 is situated at the open or close position so as to isolate the sealing mechanism 15 with respect to the valve main body 11.

15 Claims, 6 Drawing Sheets

VALVE AND VACUUM PROCESSING DEVICE WITH THE VALVE

TECHNICAL FIELD

The present invention relates to a valve provided in a gas flow path in which a gas containing, especially, at least one of corrosive gas and fine particle is allowed to flow, and a vacuum processing apparatus comprising the valve, and more specifically, to a valve having an excellent anti-corrosive property, and a high durability in function, and a vacuum processing apparatus comprising the valve.

BACKGROUND ART

In semiconductor factories, a great number of process gases are employed to process objects to be processed, such as semiconductor wafers. Further, gas pipes for feeding such process gases are provided with various types of valves for controlling the flow amounts of such gases. Note that each valve is used also as open/close means for opening/closing a connection path between chambers which constitute the vacuum processing apparatus.

The connection path connecting a processing chamber where a processing using a gas is carried out, to another chamber, and the gas flow path such as a gas pipe are exposed to gas in a great number of occasions. Therefore, especially when a gas having a corrosive property is used, there are various anti-corrosive measures are taken, such as that the section which constitutes the gas flow path is made of an anti-corrosive material.

FIG. 8 is a schematic diagram showing a part of a conventional vacuum processing apparatus which carries out a film formation process or etching process on an object to be processed, such as a semiconductor wafer. As shown in this figure, a vacuum processing apparatus A includes a processing chamber 1 for carrying out a predetermined processing on an object W to be processed with use of a gas under a predetermined vacuum atmosphere, a plurality of gas supplying pipes 2 and a gas exhaustion pipe 3, both connected to the processing chamber 1, and a valve 4 mounted on the gas exhaustion pipe 3. In the processing apparatus A described above, a plurality of kinds of process gases are supplied into the processing chamber 1 from these plurality of gas supplying pipes 2, and a predetermined process is carried out on the object W to be processed in the processing chamber 1. Further, unreacted gases, reaction byproducts and the like in the processing chamber 1 are exhausted from the processing chamber 1 via the gas exhaustion pipe 3. In this case, the flow of the exhaustion of the gas is controlled by the valve 4. Further, in many cases, a corrosive gas is used as the process gas, and therefore the gas flow paths for the processing chamber 1, the gas supplying pipe 2 and the gas exhaustion pipe 3 are treated completely to make it corrosion proof.

The valve 4 includes a valve main body, a valve member for opening/closing the gas flow path in the main body, a drive mechanism for driving the valve member and a sealing mechanism for isolating air-tightly the drive mechanism side from the valve drive mechanism. In this case, an anti-corrosive countermeasure is taken for the valve main body part which constitutes the gas flow path, but the sealing mechanism is not subjected to the anti-corrosive provisions. (Naturally, no anti-corrosive measures are taken for the drive mechanism.)

As described above, in the conventional valve, the anti-corrosive measures are not taken for the sealing mechanism, and therefore the seal mechanism is corroded with corrosive gases such as process gas and reaction byproducts. As a result, there is a danger of vacuum break caused from a corroded section of the sealing mechanism. Further, the reaction byproducts flowing through the gas exhaustion pipe 3 contains particles, and the seal mechanism may clog with some of the particles, thereby causing an operational error of the valve member or vacuum break.

DISCLOSURE OF INVENTION

An object of the present invention is to provide valve which can certainly prevent corrosion of a sealing mechanism for sealing a valve main body air-tightly with respect to a drive mechanism side, as well as the drive mechanism, and further can certainly prevent an operational error caused by particles contained in gas, thereby achieving a gas leakage proof and vacuum break proof, and a vacuum processing apparatus comprising such a valve.

The above-described object can be achieved by the following valve. That is, a valve comprising: a valve main body having an opening and forming a space which creates a part of a gas flow path; a first valve member, provided in the valve main body, for opening/closing the opening; and a drive mechanism, provided outside the valve main body, for moving the first valve member between a close position where the opening is closed and an open position where the opening is opened, wherein the drive mechanism has a rod to be reciprocated, an end of the rod extends into the valve main body through a through hole formed in the valve main body to be connected to the first valve member, the first valve member is moved between the close position and the open position as the rod is reciprocated, the valve further comprising: a sealing mechanism, which communicates into the valve main body via the through hole, for isolating the drive mechanism side air-tightly from the valve main body; and a second valve member, provided on the rod to move together with the rod as it is reciprocated, which closes the through hole when the first valve member is situated at the open or close position so as to isolate the sealing mechanism with respect to the valve main body.

BRIEF DESCRIPTION OF DRAWINGS

FIG. 8 is a conceptual diagram showing a general processing apparatus for semiconductor wafers and the like.

BEST MODE FOR CARRYING OUT OF THE INVENTION

Embodiments of the present invention will now be described with reference to the drawings.

Figure 1:
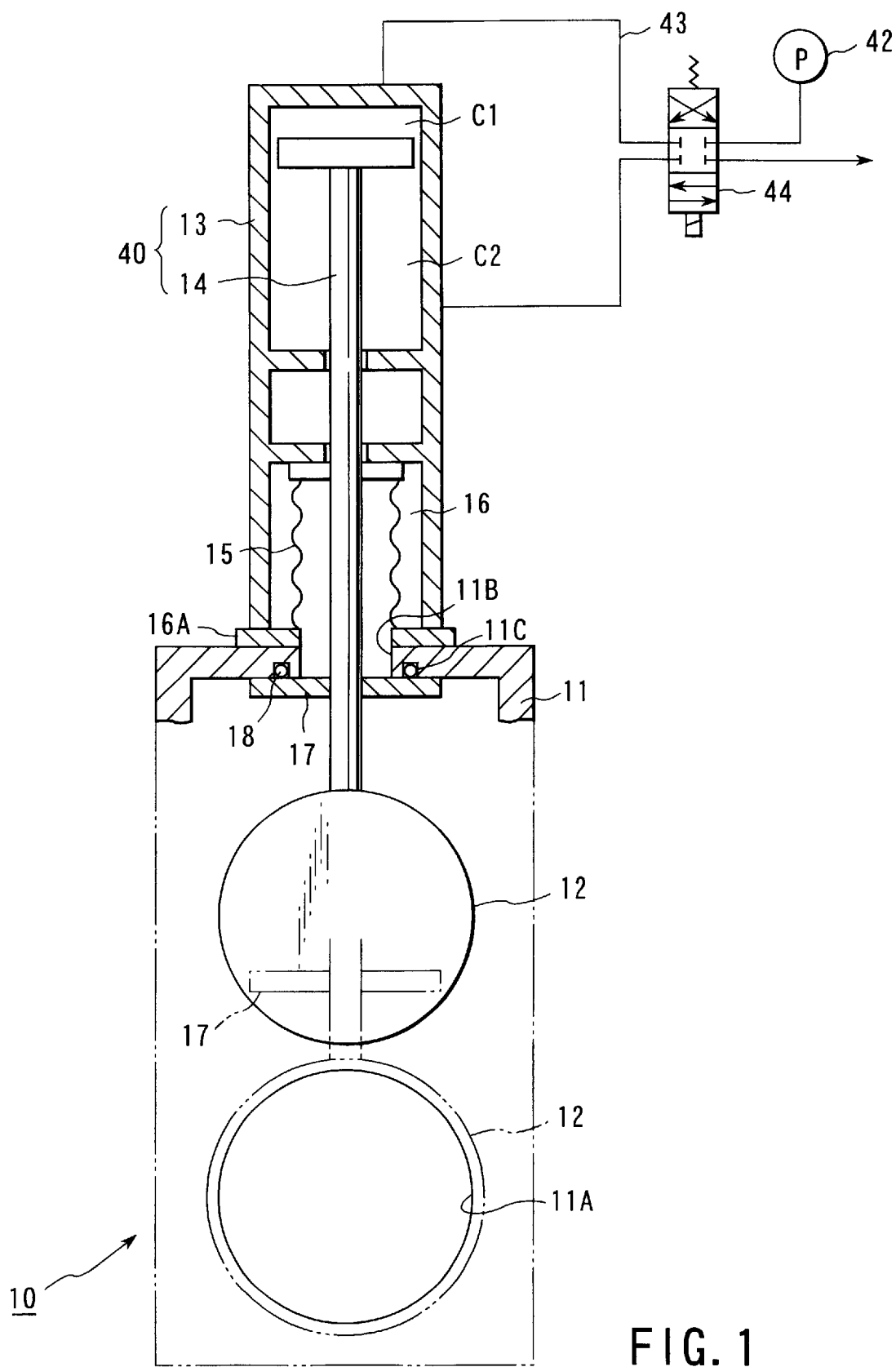
FIG. 1 is a partial cross sectional view of a valve according to the first embodiment of the present invention.
Figure 2:
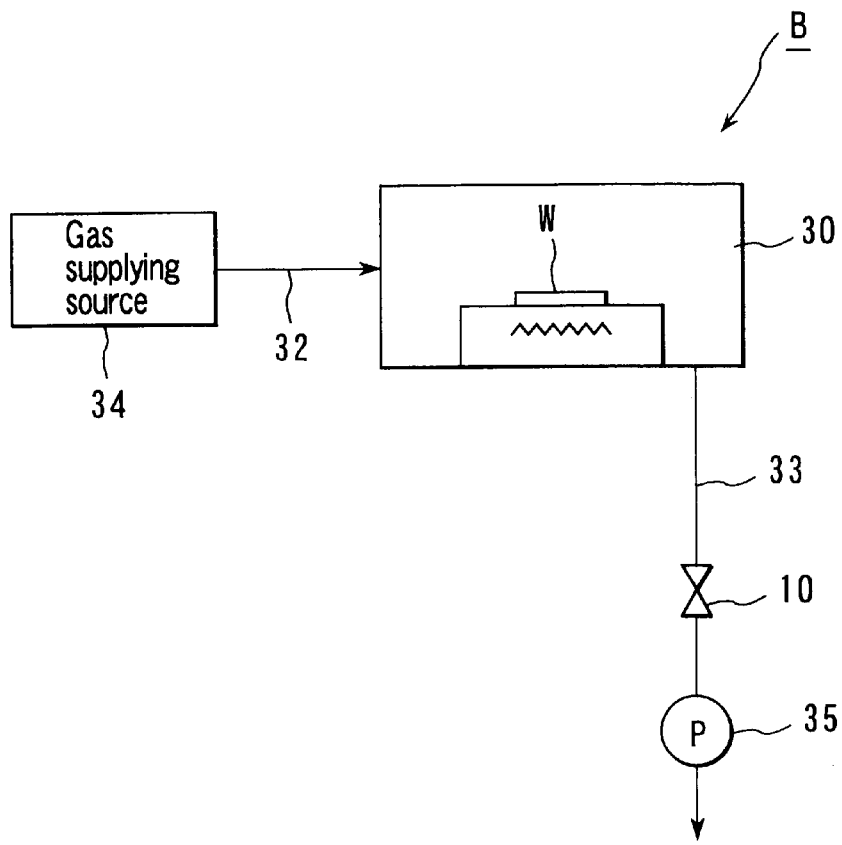
FIG. 2 is a schematic structural diagram showing a vacuum processing apparatus to which the valve shown in FIG. 1 is applied.

FIGS. 1 and 2 show the first embodiment of the present invention. As shown in FIG. 2, a vacuum processing apparatus B of this embodiment includes a processing chamber 30 for carrying out a predetermined processing on an object W to be processed with use of a process gas under a predetermined vacuum atmosphere, a plurality of gas supplying pipes 32 and a gas exhaustion pipe 33, both connected to the processing chamber 30, and a valve 10 mounted on the gas exhaustion pipe 33. The processing chamber 30 is connected to another chamber, which is not shown, such as a transfer chamber. The gas supplying pipe 32 is connected to a gas supplying source 34 for supplying the process gas. Further, the gas exhaustion pipe 33 is connected to the vacuum pump 35.

In the processing apparatus B described above, a process gas is supplied into the processing chamber 30 from the gas supplying source 34 via the gas supplying tube 32, and a predetermined process is carried out on the object W to be processed in the processing chamber 30. Unreacted gases and reaction byproducts and the like in the processing chamber 30 are exhausted from the processing chamber 30 via the gas exhaustion pipe 33 by a suction force of the vacuum pump 35. In this case, the amount of the flow of the gas exhaustion is controlled by means of the valve 10.

As shown in FIG. 1, the valve 10 includes a valve main body 11 of, for example, a rectangular shape having a gas inlet/outlet 11A to which the gas exhaustion pipe 33 is connected, a first valve member 12 which moves up and down within an inner space of the valve main body 11 which forms a gas flow path so as to open and close the gas inlet/outlet 11A, a drive mechanism 40 for moving the first valve member 12 up and down, and bellows 15 serving as a sealing mechanism for isolating air-tightly the drive mechanism 40 from the valve main body 11.

The drive mechanism 40 is comprised of a cylinder housing 13 connected to the valve main body 11 and a piston rod 14 which is connected to the first valve member 12 and reciprocated by a pressure of air supplied into the cylinder housing 13. Air is supplied into the cylinder housing 13 from a pressure source 42 via an air supplying pipe path 43. In this case, the supply of air to the bottom-side chamber C1 of the cylinder housing 13, and the head-side chamber C2 is switched by a direction switching valve 44 inserted to the air supplying pipe path 43.

The cylinder housing 13 includes a housing chamber 16 partitioned from the bottom-side chamber C1 and the head-side chamber C2. Further, the valve main body 11 has a through hole 11B for communicating the internal space of the valve main body 11 to the internal space of the housing chamber 16. The piston rod 14 extends from an inside of the head-side chamber C2 into the housing chamber 16, and also extends into the valve main body 11 via the through hole 11B of the valve main body 11. At an end of the piston rod 14 located in the valve main body 11, the first valve member 12 is mounted.

The bellows 15 are housed in the housing chamber 16 of the cylinder housing 13. Further, an upper end of the bellows 15 is coupled to the rod 14, and a lower end is coupled and fixed to a mount member 16A provided on an outer surface site of the valve main body 11. The bellows expand and contract along with the reciprocation of the piston rod 14. Further, the bellows 15 are provided such as to close the thorough hole 11B (that is, to close the gap between the rod 14 and the through hole 11B), thus forming a partition wall between the housing chamber 16 and the valve main body 11. In this manner, the air-tightness inside the valve main body 11 is maintained, and the drive mechanism 40 side and the valve main body 11 are air tightly enclosed from each other.

In order to prevent the bellows 15 from being corroded with corrosive gas flowing in the valve main body 11, a second valve member 17 is fixedly mounted on the piston rod 14 so as to close the through hole 11B thus isolating the bellows 15 from the valve main body 11 side. The second valve member 17 is made of a plate of a predetermined shape (for example, a round shape), and moves along with the motion of the first valve member 12 for opening/closing the gas inlet/outlet 11A (that is, the reciprocation of the piston rod 14), so as to open/close the through hole 11B. More specifically, the second valve member 17 closes the through hole 11B by attaching to the inner surface of the upper end portion of the valve main body 11 when the gas inlet/outlet 11A is opened by the first valve member 12, thus preventing the process gas flowing in the valve main body 11 from reaching the bellows 15 side.

It should be noted that a ring-formed groove 11C is made in the inner surface of the upper end portion of the valve main body 11 such as to surround the through hole 11B, and an O-ring 18 is fit in the groove 11C. With this structure, when the second valve member 17 is tightly attached to the inner surface of the upper end of the valve main body 11, the through hole 11B is air-tightly closed by means of the O-ring 18, and thus the bellows 15 are surely isolated from the valve main body 11 side.

Next, the operation of the valve 10 having the above-described structure will now be described.

First, as air is supplied from the pressure source 42 to the head-side chamber C2 of the cylinder housing 13 via the air supplying pipe path 43, the piston rod 14 contracts and thus the valve 10 of the gas exhaustion pipe 33 is opened. More specifically, when the piston rod 14 contracts, the first valve member 12 mounted on the piston rod 14 moves to the open position indicated by a solid line from the close position indicated by a one-dot dashed line shown in FIG. 1, and thus the gas inlet/outlet 11A of the valve main body 11 is opened. In other words, the internal space of the valve main body 11 and the gas exhaustion pipe 33 are communicated with each other. Further, when the first valve member 12 is moved to the open position, the second valve member 17 mounted on the piston rod 14 moves to the close position indicated by a solid line from the open position indicated by a one-dot dashed line shown in FIG. 1, and thus the through hole 11B of the valve main body 11 is air-tightly closed.

Then, while maintaining the above-described state, the inside of the processing chamber 30 is evacuated to a predetermined degree of vacuum. After that, a process gas is supplied from the gas supplying source 34 into the processing chamber 30 via the gas supplying pipe 32, and a predetermined process is carried out on the object W to be processed in the processing chamber 30. At the same time, unreacted process gas, and gases of reaction byproducts and the like, and particles are exhausted from the processing chamber 30 via the gas exhaustion pipe 33, and therefore they pass within the valve main body 11. At this point, even when the inside of the valve main body is filled with the exhaustion gas, the bellows 15 are isolated from the valve main body 11 side by the second valve member 17, and therefore there is no possibilities that the exhaustion gas enters the bellows 15 side. With this structure, even if the exhaustion gas contains corrosive gas, the bellows 15 will not be corroded, or a vacuum break, which is caused by the corrosion of the bellows 15, will not occur. Further, the reaction byproducts will not attach to the bellows 15 and the like.

As described above, in this embodiment, the second valve member 17, which closes the through hole 11B from inside of the valve main body 11 when the gas inlet/outlet 11A is opened by the first valve member 12, is mounted on the piston rod 14. Therefore, when the gas flows in the valve main body 11, the through hole 11B is closed, thereby preventing the gas from contacting the bellows 15. In this manner, the corrosion of the bellows (sealing mechanism) 15 which encloses the valve main body 11 air tightly from the drive mechanism 40 side, and the drive mechanism 40 itself can be surely prevented, and further the operational error due to the particles contained in the gas can be surely prevented. Eventually, it is possible to prevent the leakage of the gas or the occurrence of vacuum break.

Figure 3:
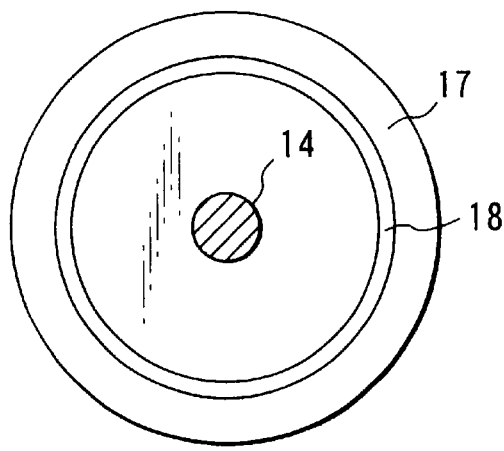
FIG. 3 is a plan view showing a remodeled version of a second valve member.

It should be noted here that in the first embodiment described above, the O-ring 18 is mounted in the ring-formed groove 11C made in the inner surface of the upper end portion of the valve main body 11; however it is alternatively possible that the O-ring 18 is provided on the surface of the second valve member 17 which is in tight contact with the inner surface of the upper end portion of the valve main body 11 as shown in FIG. 3.

Figure 4:
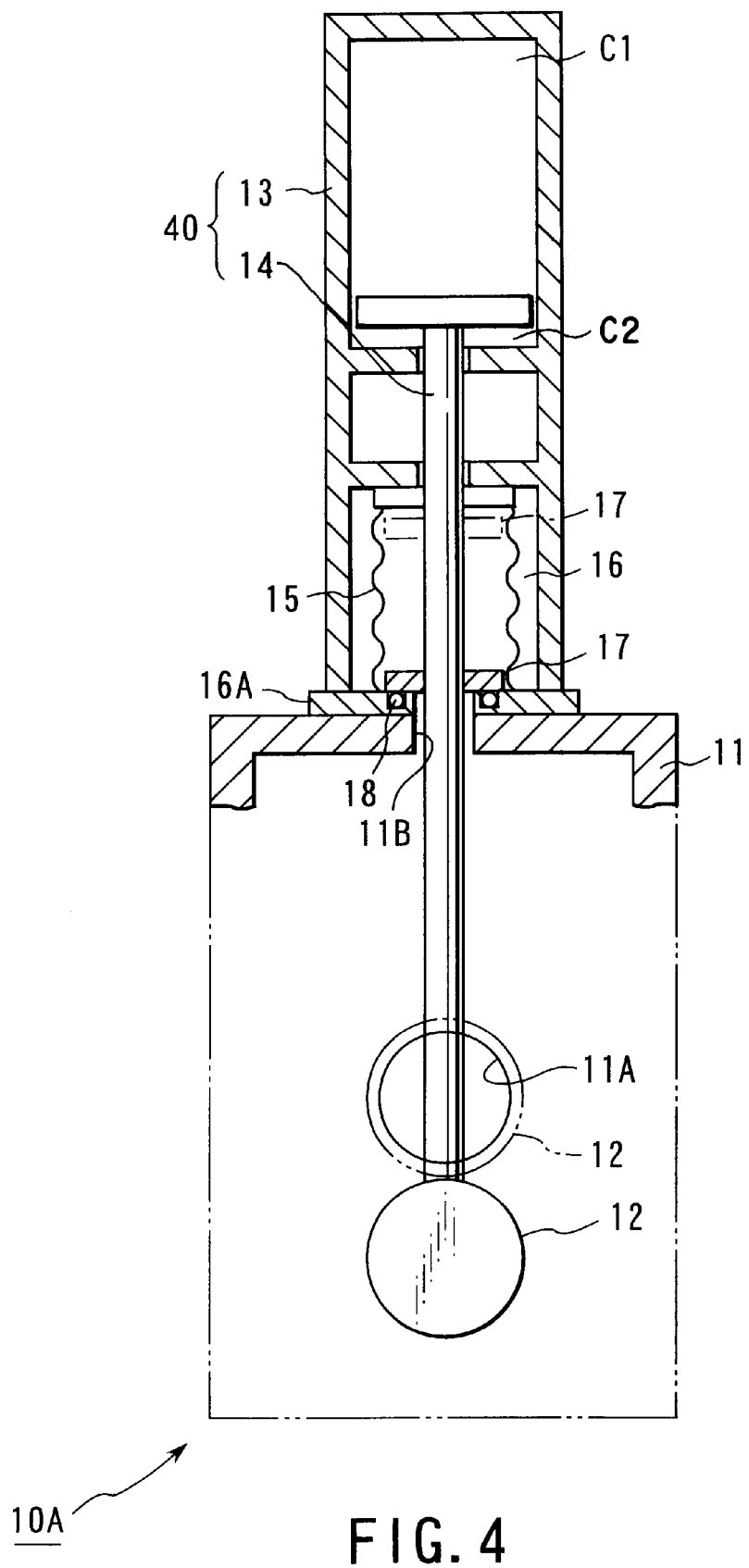
FIG. 4 is a partial cross sectional view of a valve according to the second embodiment of the present invention.

FIG. 4 shows the second embodiment of the present invention. In a valve 10A of this embodiment, the second valve member 17 is mounted and fixed to the piston rod 14 located within the housing chamber 16, and when the first valve member 12 moves to the open position indicated by a solid line from the close position indicated by a one-dot dashed line shown in FIG. 1, the second valve member 17 moves to the close position indicated by a solid line from the open position indicated by a one-dot dashed line shown in FIG. 1, thus closing the through hole 11B from the outside of the valve main body 11 (that is, the inside of the housing chamber 16). The other structural members are the same as those of the first embodiment. The structural elements in common with to those of the first embodiment are designated by the same reference numerals, and the explanations thereof will be omitted.

Figure 5:
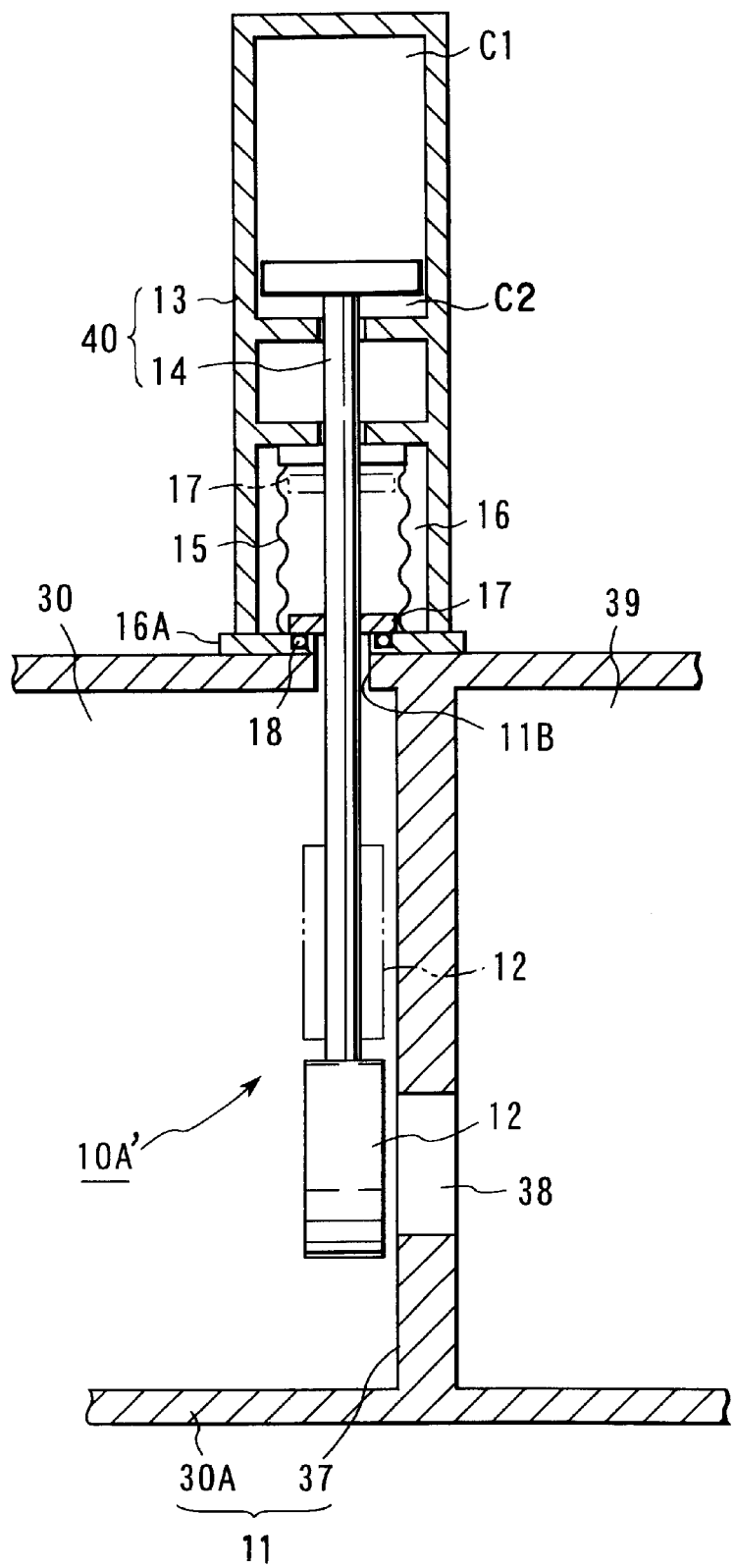
FIG. 5 is a partial cross sectional view of a valve according to the third embodiment of the present invention.

FIG. 5 shows the third embodiment of the present invention. In the above-described first and second embodiments, the valves 10 and 10A are mounted to the gas exhaustion tube 33, whereas in this embodiment, the valve 10A' of the second embodiment is provided for the connection path between the transfer chamber 30 in which a conveying device (not shown) for loading/unloading an object W to be processed with respect to the processing chamber 30 is provided, and the processing chamber 30. With this valve, an opening 38 for connecting the chambers 30 and 39 with each other is opened/closed. In this case, the valve main body 11 is made of a partition wall 37 which partitions the transfer chamber 39 and the processing chamber 30 from each other, and a housing 30A of the processing chamber 30. It should be noted here that the other structural members are the same as those of the first embodiment; therefore the structural elements in common with to those of the first embodiment are designated by the same reference numerals, and the explanations thereof will be omitted.

With this structure, when the piston rod 14 contracts, the first valve member 12 mounted on the piston rod 14 moves to the open position indicated by a one-dot dashed line from the close position indicated by a solid line shown in FIG. 5, and thus the opening 38 is opened. In other words, the chambers 30 and 39 are communicated with each other via the opening 38. It should be noted that while maintaining this state, the object W to be processed is loaded/unloaded with respect to the processing chamber 30 via the opening 38. Further, when the first valve member 12 is moved to the open position, the second valve member 17 mounted on the piston rod 14 moves to the open position indicated by a one-dot dashed line shown in FIG. 5, from the close position indicated by a solid line, and thus the through hole 11B of the valve main body 11 is opened.

On the other hand, when the piston rod 14 expands from the above-described state, the first valve member 12 mounted on the piston rod 14 moves to the close position indicated by a solid line shown in FIG. 5, and thus the opening 12 is closed. Further, when the first valve member 12 is moved to the open position, the second valve member 17 mounted on the piston rod 14 moves to the close position indicated by a solid line shown in FIG. 5, and thus the through hole 11B of the valve main body 11 is closed. While maintaining the above-described state, when a process which uses a process gas is carried out in the processing chamber 30, the through hole 11B is closed by the second valve member 17 and thus the bellows 15 are isolated from the valve main body 11 side (the processing chamber 30 side). Therefore, there are no possibilities that the process gas enters the bellows 15 side. With this structure, even if the process gas contains corrosive gas, the bellows 15 will not be corroded, or a vacuum break, which is caused by the corrosion of the bellows 15, will not occur. Further, the reaction byproducts will not attach to the bellows 15 and the like.

Figure 6:
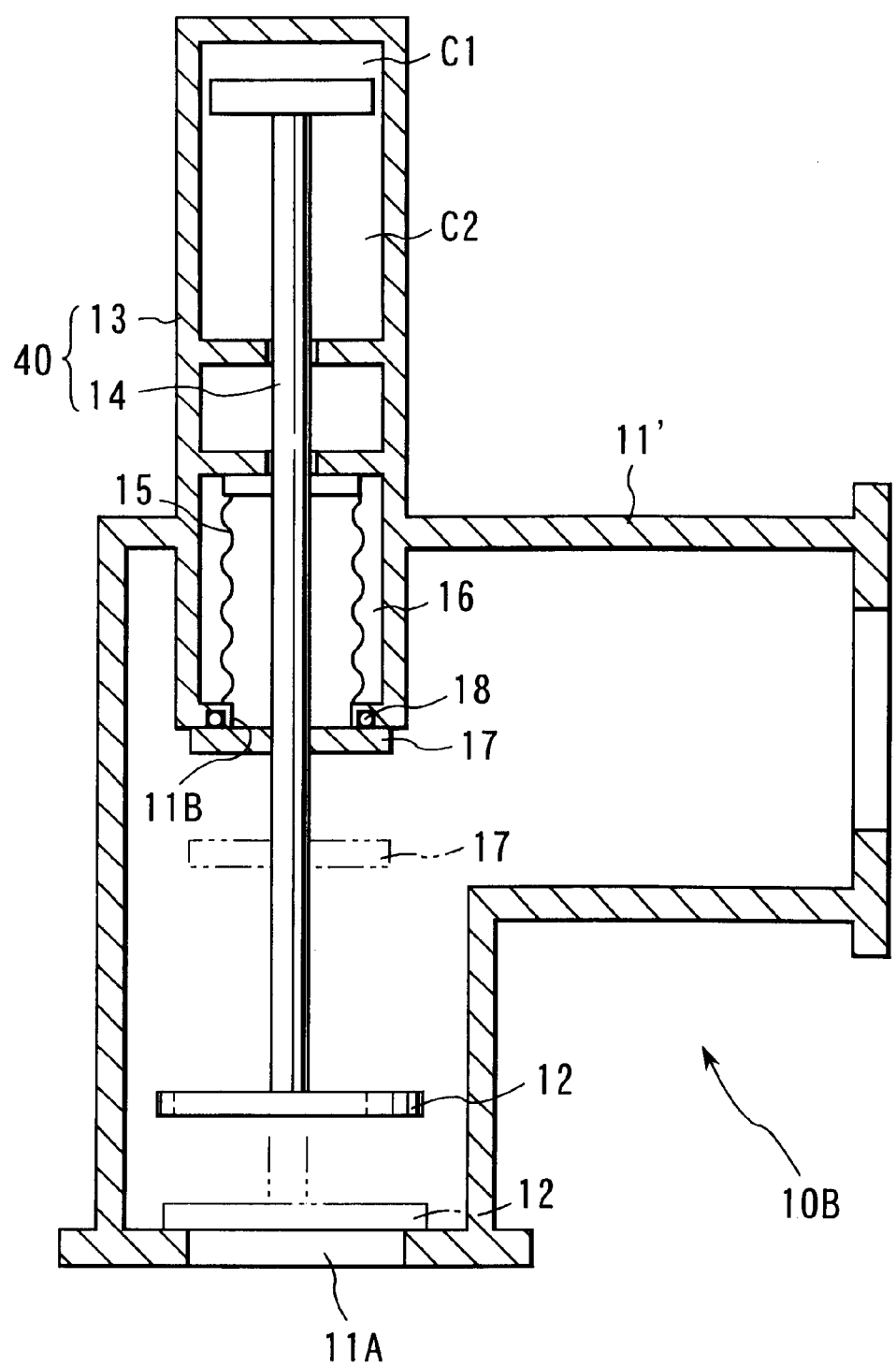
FIG. 6 is a partial cross sectional view of a valve according to the fourth embodiment of the present invention.

FIG. 6 shows the fourth embodiment of the present invention. In this embodiment, the valve structure of the first embodiment is applied to an angle valve. More specifically, an angle valve 10B of this embodiment includes an angle valve main body 11' having a shape which is bent at right angles, and having a gas inlet/outlet 11A, a first valve member 12 for opening/closing the gas inlet/outlet 11A by moving up and down within an internal space of the angle valve main body 11' which constitutes a gas flow path, a drive mechanism 40 for moving the first valve member 12 up and down, and bellows 15 serving as a sealing mechanism for isolating the drive mechanism 40 and the valve main body 11 air tightly from each other. It should be noted here that the other structural members are the same as those of the first embodiment; therefore the structural elements in common with to those of the first embodiment are designated by the same reference numerals, and the explanations thereof will be omitted.

Figure 7:
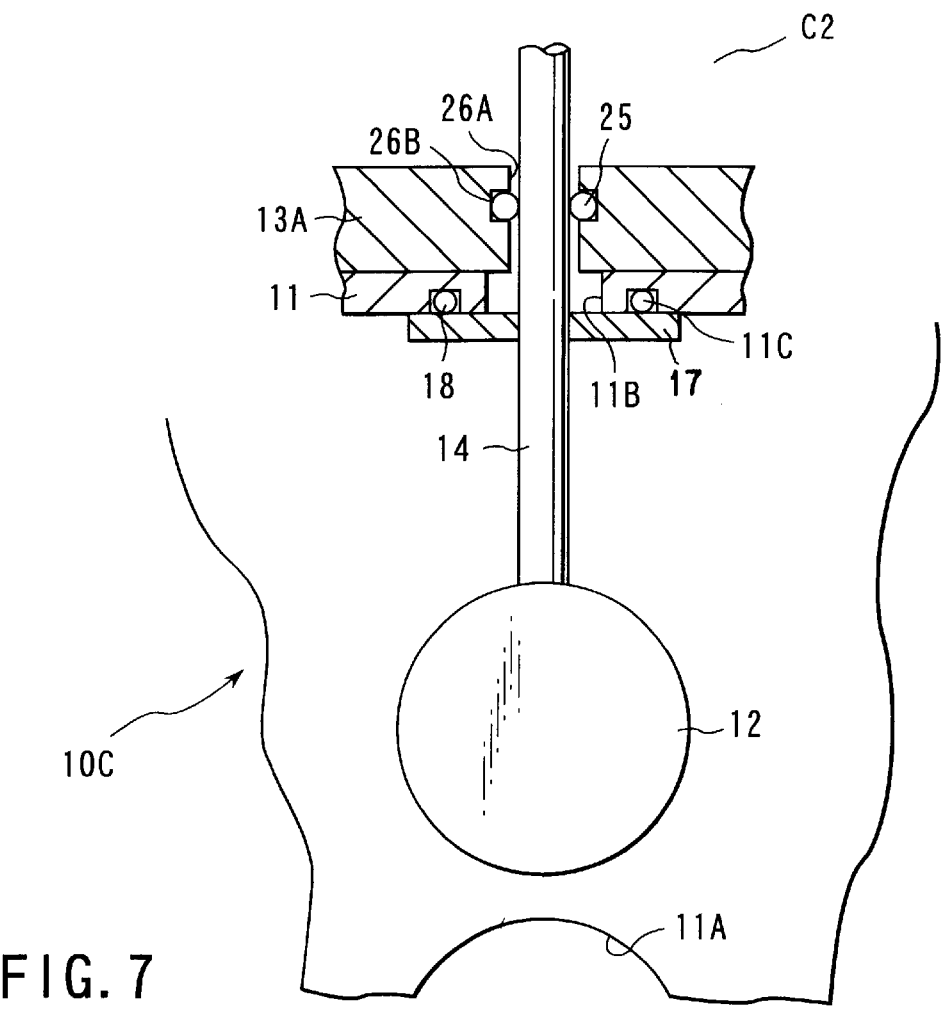
FIG. 7 is a partial cross sectional view of a valve according to the fifth embodiment of the present invention.
Figure 8:
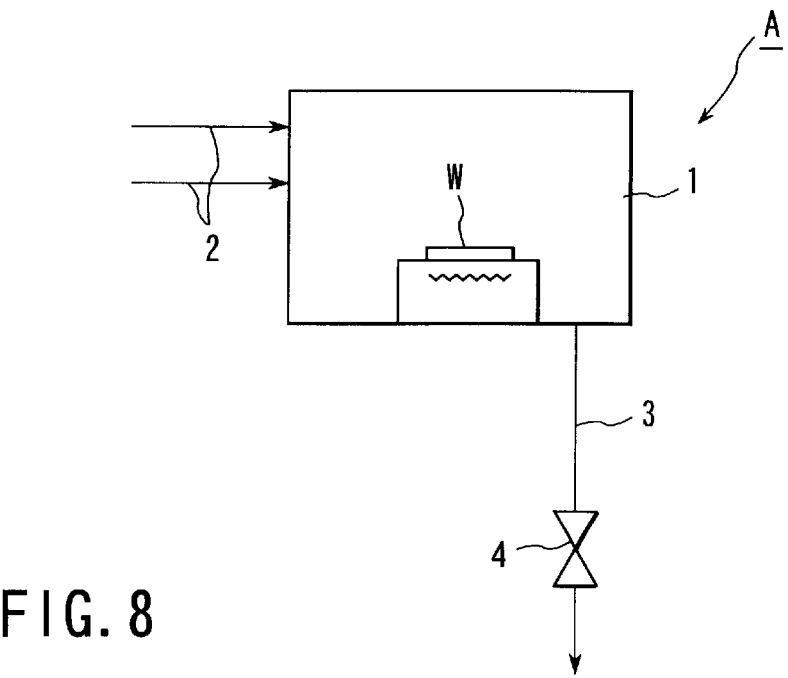

FIG. 7 shows the fifth embodiment of the present invention. It should be noted here that this embodiment is a remodeled version of the first embodiment; therefore the structural elements in common with to those of the first embodiment are designated by the same reference numerals, and the explanations thereof will be omitted.

The valve 10C of this embodiment employs an O-ring 25 serving as a sealing mechanism for isolating the drive mechanism 40 and the valve main body 11 air-tightly from each other. More specifically, the cylinder housing 13 which forms the drive mechanism 40 has a partition wall 13A which partitions the valve main body 11 and the head-side chamber C2 from each other. A through hole 26A, through which the piston rods 14 is put, is made in the partition wall 13A. Further, a groove 26B is made in the inner circumferential surface of the through hole 26A over its entire circumference, and an O-ring 25 is fit in the groove 26B. With this structure, the O-ring 25 serves to seal a space between the inner circumferential surface of the through hole 26A and the rod 14, so as to maintain the air-tightness inside the valve main body 11, and thus the drive mechanism 40 side is surely isolated from the valve main body 11.

With this structure, even when the inside of the valve main body 11 is filled with the exhaustion gas, the O-ring 25 is isolated from the valve main body 11 side by the second valve member 17, and therefore there is no possibilities that the exhaustion gas enters the O-ring 25 side. With this structure, even if the exhaustion gas contains corrosive gas, the O-ring 25 will not be corroded, or a vacuum break, which is caused by the corrosion of the O-ring 25, will not occur. Further, particles will not attach to the through hole 26A or the O-ring 25, and therefore while the rod 14 is sliding, particles will not be filled between the rod 14 and the ring 25. Therefore, there are no possibilities of a vacuum break or operational error due to the clogging with the particles.

It should be noted that the present invention is not limited to the embodiments described above, but it can be remodeled into various versions as long as its essence remains. That is, the above-described embodiments are explained by taking an example of the case where a gate valve for driving a valve member by means of a cylinder and a rod is employed; however the present invention can be applied to all kinds of valves in which an operational rod is pierced through the valve main body. Alternatively, the present invention can be applied to a valve which employs a driving mechanism or a driving force transmitting mechanism other than a cylinder and rod. Further, in the above-described embodiments, a valve is applied to a gas exhaustion pipe of a processing apparatus of a semiconductor factory; however it is only natural that the valve of the present invention can be widely applied to all kinds of gas pipes which send gases at a pressure.

What is claimed is:

1. A vacuum gate valve comprising:
   a valve main body having an opening and forming a space into which a gas is allowed to flow via the opening or other gas supplying opening, an inside of which is evacuated;
   a first valve member, provided in the valve main body, for opening/closing the opening; and
   a drive mechanism, provided outside the valve main body, for moving the first valve member between a close position where the opening is closed and an open position where the opening is opened,
   wherein the drive mechanism has a rod to be reciprocated, an end of the rod extends into the valve main body through a through hole formed in the valve main body to be connected to the first valve member, the first valve member is moved between the close position and the open position as the rod is reciprocated, and
   said vacuum gate valve further comprising:
      a sealing mechanism, which communicates into the valve main body via the through hole, for isolating the drive mechanism side air-tightly from the valve main body; and
      a second valve member, provided on the rod to move together with the rod as it is reciprocated, which closes the through hole when the first valve member is situated at the open or close position so as to prevent the gas within the valve main body from contacting the sealing mechanism while maintaining the degree of vacuum within the valve main body.

2. A vacuum gate valve according to claim 1, wherein the opening of the valve main body is a connection opening to which a pipe is connected in which a gas containing at least one of a corrosive gas and fine particles flows.

3. A valve according to claim 1, wherein the opening is designed to communicate two chambers with each other.

4. A vacuum gate valve according to claim 1, wherein the second valve member isolates the sealing mechanism from the valve main body by closing the through hole when the first valve member is situated at the open position.

5. A vacuum gate valve according to claim 1, wherein the second valve member isolates the sealing mechanism from the valve main body by closing the through hole when the first valve member is situated at the close position.

6. A vacuum gate valve according to claim 1, wherein the sealing mechanism is made of bellows.

7. A vacuum gate valve according to claim 1, wherein the sealing mechanism is made of an O-ring.

8. A vacuum gate valve according to claim 1, wherein:
   the second valve member closes the through hole as the second valve member is brought into contact with an inner surface site of the valve main body, where the through hole is made; and
   the inner surface site of the valve main body with which the second valve member is brought into contact, or a contact surface of the second valve member, which is brought into contact with the inner surface site of the valve main body, is provided with a sealing member for sealing a space between the second valve member and the valve main body air tightly.

9. A vacuum gate valve according to claim 1, wherein:
   the second valve member closes the through hole as the second valve member is brought into contact with an outer surface site of the valve main body, where the through hole is made; and
   the outer surface site of the valve main body with which the second valve member is brought into contact, or a contact surface of the second valve member, which is brought into contact with the outer surface site of the valve main body, is provided with a sealing member for sealing a space between the second valve member and the valve main body air tightly.

10. A vacuum processing apparatus comprising:
   a processing chamber for carrying out a predetermined process on an object to be processed with use of a process gas under a predetermined vacuum atmosphere;
   at least one gas supply pipe for supplying a process gas from a gas supplying source to the processing chamber;
   a gas exhaustion pipe, one end of which is connected to the processing chamber, and another end connected to a vacuum pump, for discharging the gas inside the processing chamber so as to make a predetermined degree of vacuum in the processing chamber; and
   a gate valve, inserted to the gas exhaustion pipe, for opening/closing a gas flow path of the gas exhaustion pipe,
   said gate valve comprising:
      a valve main body having a gas inlet/outlet to which the gas exhaustion pipe is connected and forming a space which creates a part of a gas flow path;
      a first valve member, provided in the valve main body, for opening/closing the gas inlet/outlet; and
      a drive mechanism, provided outside the valve main body, for moving the first valve member between a close position where the gas inlet/outlet is closed and an open position where the gas inlet/outlet is opened,
      wherein the drive mechanism has a rod to be reciprocated, an end of the rod extends into the valve main body through a through hole formed in the valve main body to be connected to the first valve member, and the first valve member is moved between the close position and the open position as the rod is reciprocated, and said gate valve further comprising:
  a sealing mechanism, which communicates into the valve main body via the through hole, for isolating the drive mechanism side air-tightly from the valve main body; and
  a second valve member, provided on the rod to move together with the rod as it is reciprocated, which closes the through hole when the first valve member is situated at the open position so as to prevent the gas within the valve main body from contacting the sealing mechanism while maintaining the degree of vacuum within the valve main body.

11. A vacuum processing apparatus according to claim 10, wherein the sealing mechanism is made of bellows.

12. A vacuum processing apparatus according to claim 10, wherein the sealing mechanism is made of an O-ring.

13. A vacuum processing apparatus according to claim 10, wherein:
  the second valve member closes the through hole as the second valve member is brought into contact with an inner surface site of the valve main body, where the through hole is made; and
  the inner surface site of the valve main body with which the second valve member is brought into contact, or a contact surface of the second valve member, which is brought into contact with the inner surface site of the valve main body, is provided with a sealing member for sealing a space between the second valve member and the valve main body air tightly.

14. A vacuum processing apparatus comprising:
  a processing chamber for carrying out a predetermined process on an object to be processed with use of a process gas under a predetermined vacuum atmosphere;
  at least one gas supply pipe for supplying a process gas from a gas supplying source to the processing chamber;
  a gas exhaustion pipe, one end of which is connected to the processing chamber, and another end connected to a vacuum pump, for discharging the gas inside the processing chamber so as to make a predetermined degree of vacuum in the processing chamber; and
  a gate valve, situated between the processing chamber and a chamber adjacent thereto, for opening/closing a gas flow path between these chambers,
  said gate valve comprising:
    a first valve member for opening/closing an opening formed in a partition wall which partitions the processing chamber and the chamber adjacent thereto; and
    a drive mechanism, provided outside the valve main body, for moving the first valve member between a close position where the opening is closed and an open position where the opening is opened,
    wherein the drive mechanism has a rod to be reciprocated, an end of the rod extends into the processing chamber through a through hole formed in the processing chamber to be connected to the first valve member, and the first valve member is moved between the close position and the open position as the rod is reciprocated, and
  said gate valve further comprising:
    a sealing mechanism, which communicates into the processing chamber via the through hole, for isolating the drive mechanism-side air-tightly from the processing chamber; and
    a second valve member, provided on the rod to move together with the rod as it is reciprocated, which closes the through hole when the first valve member is situated at the close position so as to prevent the gas within the processing chamber from contacting the sealing mechanism while maintaining the degree of vacuum within the processing chamber.

15. A vacuum processing apparatus according to claim 14, wherein:
  the second valve member closes the through hole as the second valve member is brought into contact with an outer surface site of the valve main body, where the through hole is made; and
  the outer surface site of the valve main body with which the second valve member is brought into contact, or a contact surface of the second valve member, which is brought into contact with the outer surface site of the valve main body, is provided with a sealing member for sealing a space between the second valve member and the valve main body air tightly.

* * * * *